United States Patent
Guetta et al.

(10) Patent No.: US 8,982,333 B2
(45) Date of Patent: Mar. 17, 2015

(54) AERIAL OBSERVATION SYSTEM

(75) Inventors: Avishay Guetta, Rehovot (IL); Yuval Guetta, Ashdod (IL); Rafael Ambar, Ramat Gan (IL)

(73) Assignee: Shilat Optronics Ltd., Rehovot (IL)

( * ) Notice: Subject to any disclaimer, the term of this patent is extended or adjusted under 35 U.S.C. 154(b) by 21 days.

(21) Appl. No.: 13/119,968

(22) PCT Filed: Sep. 21, 2009

(86) PCT No.: PCT/IL2009/000914
§ 371 (c)(1),
(2), (4) Date: Jun. 2, 2011

(87) PCT Pub. No.: WO2010/032251
PCT Pub. Date: Mar. 25, 2010

(65) Prior Publication Data
US 2011/0222047 A1     Sep. 15, 2011

Related U.S. Application Data (60) Provisional application No. 61/192,445, filed on Sep. 19, 2008.

(51) Int. Cl.
*G01C 3/08* (2006.01)
*B64B 1/50* (2006.01)

(52) U.S. Cl.
CPC .................................. *B64B 1/50* (2013.01)
USPC ........................ 356/4.01; 362/553; 398/171

(58) Field of Classification Search
CPC ........ G01C 3/08; G01C 15/002; G01S 17/89; G01S 7/4817; G01S 14/42; B63B 49/00; B64D 43/00; F41G 3/00
USPC ............................ 356/4.01; 362/553; 398/171
See application file for complete search history.

(56) References Cited

U.S. PATENT DOCUMENTS

| | | |
|---|---|---|
| 2,398,745 A | 4/1946 | Jalbert |
| 2,431,938 A | 12/1947 | Jalbert |

(Continued)

FOREIGN PATENT DOCUMENTS

| | | |
|---|---|---|
| DE | 19808777 A1 | 9/1999 |
| EP | 0771729 A1 | 5/1997 |
| WO | 2007/141795 A1 | 12/2007 |

OTHER PUBLICATIONS

USAF Air Combat Command, "Tethered Aerostat Radar System". Mar. 28, 2007. http://www.acc.af.mil/library/factsheets/factsheet.asp?id=2359.*

(Continued)

*Primary Examiner* — Isam Alsomiri
*Assistant Examiner* — Samantha K Abraham
(74) *Attorney, Agent, or Firm* — Daniel J. Swirsky; AlphaPatent Associates Ltd.

(57) ABSTRACT

An aerial platform comprising a kite providing a level of directional stability when elevated by the wind, and an inflated balloon attached above the kite with a cord. The payload is attached to the kite. The physical separation of the balloon from the kite isolates the payload from shocks generated by the balloon. Additional isolation is provided by use of an elastic attachment cord. Electric power is supplied to the aerial platform by means of an optical fiber receiving optical power from a ground-based source, and conversion of the optical power to electrical power on board the platform. In order to provide a strong tether line, the optical fiber is plaited with a jacket braided from high tensile strength fibers. An aerial laser transmitter is described using a ground based laser source transmitting laser power through an optical fiber to an aerial platform for transmission from the platform.

4 Claims, 7 Drawing Sheets

(56) References Cited

U.S. PATENT DOCUMENTS

| | | | |
|---|---|---|---|
| 4,029,273 A | | 6/1977 | Christoffel, Jr. |
| 5,074,489 A * | | 12/1991 | Gamzon .................... 244/2 |
| 5,115,997 A * | | 5/1992 | Peterson .................. 244/25 |
| 5,310,134 A | | 5/1994 | Hsu et al. |
| 5,412,684 A * | | 5/1995 | Schlie et al. ............... 372/82 |
| 5,491,572 A * | | 2/1996 | Ohara ....................... 398/15 |
| 5,734,773 A * | | 3/1998 | Teshima et al. ........... 385/126 |
| 5,920,671 A * | | 7/1999 | Smith ...................... 385/102 |
| 6,016,998 A | | 1/2000 | Allsopp |
| 6,325,330 B1 | | 12/2001 | Lavan, Jr. |
| 6,422,506 B1 | | 7/2002 | Colby |
| 6,499,695 B1 | | 12/2002 | Talamo |
| 6,555,932 B1 | | 4/2003 | Albrecht |
| 6,961,171 B2 * | | 11/2005 | Byren et al. ............... 359/333 |
| 2008/0115716 A1 * | | 5/2008 | Wrage ....................... 114/343 |

OTHER PUBLICATIONS

Raytheon, "RAID System—Mobile High Ground for the Warfighter". Apr. 17, 2006. http://www.raytheon.com/businesses/stellent/groups/ids/documents/content/cms04_016364.pdf.*

Robert Aldrich. "Laser Fundamentals", Jan. 27, 1999 [Wayback Machine]. http://www.fas.org/man/dod-101/navy/docs/laser/fundamentals.htm.*

Allsopp Helikite Brochure, published on the Internet on Jul. 5, 2008, Hampshire, England.

SkyDoc Balloon Brochure, published on the Internet May 9, 2008, Scappoose, Oregon.

PCT International Search Report and Written Opinion in corresponding PCT/IL2009/000914, published on Jun. 7, 2010.

Supplementary extended European Search Report dated Aug. 21, 2013, in corresponding European patent application No. 09814182.3.

* cited by examiner

AERIAL OBSERVATION SYSTEM

CROSS-REFERENCE TO RELATED APPLICATIONS

The current application is a U.S. National Phase Application under 35 U.S.C. 371 of PCT International Application No. PCT/IL2009/000914, which has an international filing date of Sep. 21, 2009, and which claims the benefit of priority from U.S. Provisional Patent Application No. 61/192,445, filed Sep. 19, 2008, the disclosures of which are incorporated herein by reference.

FIELD OF THE INVENTION

The present invention relates to the field of lighter-than-air platforms connected to the ground by cable, especially when powered from the ground by optical power, and to the field of power transmission by optical cable in general.

BACKGROUND OF THE INVENTION

There exist a number of unpowered lighter-than-air systems for use, inter alia, as aerial surveillance or wireless relay platforms. In U.S. Pat. Nos. 2,398,745 and 2,431,938 to Jalbert, there are described kite-balloons for such use. In U.S. Pat. No. 4,029,273 to Cristoffel Jr, in U.S. Pat. No. 6,016,998 to R. Allsopp, and in U.S. Pat. No. 6,499,695 to Talamo, there are described various configurations of balloon/kite vehicles, for ensuring stable flight in various wind conditions. In U.S. Pat. No. 6,555,932 to Mizzi, there is described a combined buoyant airfoil for use in generating electric wind power of for aerial advertising. Such combination balloon/kite systems are also available commercially for surveillance and advertising use, such as the SkyDoc™ Aerostat, supplied by Floatograph Technologies LLC, of Silver Spring Md., or the Helikite, supplied by Allsopp Helikites Ltd of Fordingbridge, Hampshire, UK. Such systems have been used for military and civilian use, and the data generated has been described as conveyed to and from the ground station by means of wireless, cable or optical fiber.

The disclosures of each of the publications mentioned in this section and in other sections of the specification, are hereby incorporated by reference, each in its entirety.

SUMMARY OF THE INVENTION

The present invention seeks to provide a new lighter-than-air platform, which can carry a payload useful for such tasks as aerial surveillance, target designation, target pointing, laser range finding, wireless relaying, and the like. The system differs in its flight characteristic properties from prior art lighter-than-air systems in that it comprises a novel combination of a separated support balloon and a kite, with the payload on the kite, and the balloon supplying buoyancy to the kite by means of a line attached between the balloon and the kite below it. This differs from prior art balloon/kite combinations, where the balloon and the kite features are built as the same unitary structure. The use of separate kite and balloon modules provides a level of mechanical isolation of the payload on the kite from the effects of buffeting of the balloon in the wind. This isolation effect can be increased by use of a longer connecting cord, or by use of a flexible section of the connecting cord, such as a spring, or an elastomeric section. The combination kite/balloon also has all of the known advantages of prior art kite/balloon systems, such as the increased altitude achieved by the combination over that of a balloon only, because of the increased dynamic lifting effect of the kite section with increase in wind speed.

The system described in this application also differs from prior art aerial systems in the method by which power is supplied to the platform from the ground. The use of an electrical conductor pair would result in a feed cable of such additional weight that it would limit the payload that can be carried by the platform. In order to provide a light weight, high power feed, the present described system transmits power from the ground skyward in the form of optical power, and converts the optical power to electric power on the airborne vehicle. An optical fiber may be used to transmit the power. In order to provide the optical fiber link with sufficient mechanical strength to tether the system safely, and to maintain control of the platform in flight during inclement wind conditions, the fiber may be enclosed in a plaited outer jacket made of thin fibers or threads of a material having high mechanical strength, which not only provide the required mechanical strength, but also protect the bare fiber from mechanical damage. Such a composite construction provides the connecting line with significantly more strength and flexibility than would be obtained by use of a separate tether line with a fiber attached thereto. Such an optical power transmission line, with its dual characteristics of light weight and high mechanical strength, can be used advantageously also for transmitting power over ground terrain, or other non-airborne situations, where the use of conventional metallic cable conductors would be too heavy or cumbersome for the use envisaged.

The exemplary implementations in this disclosure are generally shown using a single optical fiber to transmit the power skyward. However, more than one optical fiber may also be used to transmit the power. The minimum weight configuration will generally be that using a single fiber in a single optical power transmission cord, so this is the example used to illustrate the systems described in this disclosure. Such a configuration generally enables a platform of minimum size and weight to be used, with its concomitant advantages of ease of transport, ease of deployment, and even the lack of the need for regulatory permission to fly the platform. It is to be understood, however, that the claimed invention is not meant to be limited to systems using a single optical fiber, but that optical power transmission cords incorporating more than one fiber are also meant to be covered, as are aerial platforms having more than one optical power transmission cord to convey the power skywards. Additionally, although the novel braided structure described in this disclosure provides a compact and strong configuration for the optical power transmission line, it is to be understood that other configurations are also possible, such as having the mechanical fibers arranged parallel to the optical fiber and attached thereto, or having a mechanical fiber and an optical fiber twisted together, like a twisted pair, either continuously along their length, or periodically along their length. It is to be understood that those aspects of the claimed invention which do not address the exact structure of the optical transmission line are intended to cover other such configurations also.

The high optical power transmitted through the fiber may present a potential eye hazard if the light power were to escape due to light leakage, or due to breakage of the connection wire. In order to protect ground personnel from optical power leakage, an opaque sleeve may be used to enclose the connection line up to a height above the ground sufficiently higher than a person standing on the ground that the power density of any escaping light will have dropped below the eye hazard level at the eye height of the personnel. In order to protect from light leakage due to line breakage, which is potentially more dangerous, an optical monitor signal is transmitted along the length of the fiber, and if cessation of reception is detected, a control circuit stops optical power feed into the fiber.

The payload can be of any type that is usually carried by airborne surveillance vehicles, including long range observation whether in the visible or infra-red spectrum, laser designating, pointing and range finding, wireless applications such as wireless relaying, and other such applications.

The payload can be stabilized either passively or actively. Passive stabilization can be supplied either:
(i) by use of the well known Picavet suspension system, or an adaption thereof, or any other known passive mechanical stabilization system, or
(ii) by use of a novel suspension system, based on the mounting of the payload on the kite by means of a gimbal system, advantageously using two generally orthogonal gimbals, allowing freedom of roll and pitch motion of the payload relative to the kite. It is to be understood that the terms roll and pitch are used in their normal nautical or aeronautical sense—roll being rotation about an axis generally in the direction of the length of the motion platform, and pitch being rotation about an axis generally horizontally perpendicular to the direction of the length of the motion platform. Each of the gimbal axes are attached to a point on the kite anchoring line at a distance below the kite, and positive tension is maintained in these attachment lines. This positive tension can be supplied either by means of small weights which are constrained to slide on the anchoring line, or by incorporation of an elastic section in the attachment lines to maintain positive tension. Even if the kite undergoes drastic changes it its flight attitude, the anchoring line changes its orientation angle by significantly smaller levels, and even negligibly if the anchoring line is sufficiently long, such that the referencing of the payload stabilization direction to a distant point on the kite anchoring line rather than to the kite itself, results in a greatly reduced effect on the payload, of changes in the kite orientation.

Active stabilization can be achieved by any of the known method, such as by the use of angular accelerometer stabilization, or by using GPS referencing to stabilize the platform The use of optical power delivery from the ground station to the kite/balloon enables a further novel application of the system for use in laser range finding or target designation. As is known from other airborne surveillance systems, a significant portion of the payload weight may taken up by the weight of the laser power supply, quite apart from the weight of the power source and of the laser itself, especially if the laser is a discrete component laser, such as a Nd:YAG laser, having a comparatively low efficiency, as compared with a diode or fiber laser. According to this implementation of the laser designating system, the laser, together with its power source and power supply, can be located in the ground station, and the laser light piped up to the kite payload through the optical power feed fiber. The payload need then only carry the collimating optics, and the directional steering components for directing the laser beam in the direction to designate the desired target. These components are substantially lighter than the weight of the laser and power supply, such that a significant part of the payload weight may be saved.

It is to be understood that although the specific novel aerial platform described so far in this application is a balloon/kite combination, with certain mutual positioning and connection features, it is to be understood that other implementations described in this application, such as the method of supplying power optically, the stabilizing suspension system, and others, are not meant to be limited to such a balloon/kite combination, but are applicable to any tethered aerial vehicle, whether a lighter-than-air balloon platform, or a kite platform, or a combination of both. This proviso is understood to apply generally throughout this application, other than in situations where it is evident that the described features are irrelevant or unnecessary to one or another type of platform.

Furthermore, although the uses and structures of the optical power supply cables have been described so far only in relation to a tethered airborne platform, since such a platform usually has very limited lateral mobility and is thus readily adaptable to power feeding by an attached line, there are also free flying applications which could also benefit from the various implementations of the systems and methods described in this disclosure. Thus, one of the limitations of small pilotless vehicles for surveillance use is the need for electrical power to power the on-board electronic equipment. It is often the battery capacity which limits the flight endurance time of such small vehicles. Since such small pilotless aircraft may often be used for very localized missions, flying within a region of only a very few kilometers or less, another use of the systems and cables described in this disclosure could be to supply power to such a drone, by trailing an optical cable from the drone to a ground station providing the optical power. The ground station would pay out the cable length needed depending on the distance and height of the drone from the ground station, and would reel in surplus cable as the drone got closer. This application to a non tethered free-flying platform, would advantageously utilize the special characteristics of the optical cables described in this application, namely light weight coupled with high tensile strength.

There is thus provided in accordance with some exemplary implementations of the systems described in this disclosure, a system for providing a laser beam for emission by an airborne platform, the system comprising:
(i) a ground-based laser source,
(ii) a fiber optical line connecting the ground-based laser source to the airborne platform, the fiber optical line adapted to receive optical power from the laser source, and
(iii) an optical unit mounted on the airborne platform, receiving optical power from the fiber optical line and transmitting at least part of the optical power into free space as the laser beam. The system may further comprise an optical steering module, such that the laser beam can be directed to a predetermined target. The optical steering module may be part of the optical unit. In such a system with an optical steering module, the laser beam may be directed to designate the target or to point to the target.

Such a system may also comprise an optical receiving element for receiving laser light reflected from the target, such that the range of the target can be determined. In this case, the laser light from the optical receiving element may be fiber optically transmitted from the airborne platform to a ground-based range finding analyzer, or it may be converted to an electrical signal on board the airborne platform, the electrical signal containing information relating to the range of the target. In the latter case, the electrical signal may either be transmitted wirelessly to a ground station for extracting the range information, or the information relating to the range of the target may be extracted electronically on board the airborne platform.

In any of these laser range finding implementations, the ground-based laser range finding analyzer could measure the distance from the ground station to the airborne platform, so that the range measurement of the target from the airborne platform can be more accurately determined. In this case, the measured distance from the ground station to the airborne platform is subtracted from the measured range of the target from the ground-based laser range finding analyzer.

Any of the above described systems may be implemented in situations where the airborne platform is either a tethered platform or a free-flying platform.

Additional implementations may involve a system for supplying electric power to an aerial platform, comprising:
(i) a ground-based source of optical power,
(ii) an optical power transmission cord comprising at least one optical fiber adapted to receive optical power from the source, and
(iii) an optical power receiver disposed on the aerial platform, adapted to convert optical power received from the optical power transmission cord into electricity.

In such an exemplary system, the optical power transmission cord may further comprise at least one non-optical fiber coupled with the at least one optical fiber, such that the optical power transmission cord is provided with mechanical strength substantially in excess of that of the at least one optical fiber. In such a case, at least some of the non-optical fibers act as a jacket to one of the at least one optical fiber. Additionally, at least some of the non-optical fibers may be plaited around one of the at least one optical fiber, or at least one of the non-optical fibers may be arranged parallel to one of the at least one optical fiber. Furthermore, at least one of the non-optical fiber and one of the at least one optical fiber may be twisted along at least part of their length. In any of these exemplary implementations, at least one of the at least one optical fiber may be a bare fiber.

Such types of exemplary systems as described above may further comprise at least one light modulating module, such that the at least one optical fiber can also transmit modulated data to or from the aerial platform.

Furthermore, in any of these systems, the optical power transmission cord is electrically insulating.

Additionally, alternative implementations of any of the above-described systems may further comprise:
(i) a source generating an optical monitor signal, the optical monitor signal being optically coupled to the optical fiber of the optical power transmission cord in the region of one extremity of the optical fiber,
(ii) an optical monitor signal detector receiving the optical monitor signal in the region of the second extremity of the optical fiber, and
(iii) a control system adapted to disenable the ground-based source of optical power if detection of the optical monitor signal ceases.

In any of the above described systems for supplying electric power to an aerial platform, at least one of the non-optical fibers may be constructed of an ultra high molecular weight polyethylene.

Additionally, the airborne platform supplied by these systems may be either a tethered platform or a free-flying platform.

Another example implementation can involve a method of reducing the weight of an electric power supply line to an aerial platform, comprising:
(i) supplying optical power from a ground-based source,
(ii) providing an optical power transmission cord comprising at least one optical fiber, for connecting the ground-based optical power source with the aerial platform,
(iii) transmitting the optical power through the optical power transmission cord to the aerial platform, and
(iv) converting optical power received from the optical power transmission cord into electricity on the aerial platform, wherein the optical power transmission cord is selected such that its weight per unit length is less than that of an electrical conduction cord of the same power handling capacity.

In this method, the optical power transmission cord used may further comprise at least one non-optical fiber coupled with the at least one optical fiber, such that the optical power transmission cord is provided with mechanical strength substantially in excess of that of the at least one optical fiber. At least some of the non-optical fibers may jacket one of the at least one optical fiber. Additionally, at least some of the non-optical fibers may be plaited around one of the at least one optical fiber, or at least one of the non-optical fibers may be arranged parallel to one of the at least one optical fiber. Furthermore, at least one of the non-optical fiber and one of the at least one optical fiber may be twisted along at least part of their length. In any of these exemplary methods, at least one of the at least one optical fiber may be a bare fiber.

In all of these methods, the aerial platform may be either a tethered platform or a free-flying platform.

Additional implementations may involve an optical power transmission cord comprising an optical fiber adapted to transmit the optical power, and at least one non-optical fiber plaited around the optical fiber. The at least one plaited non-optical fiber may form a jacket to the optical fiber. Furthermore, at least one of the non-optical fibers may be constructed of an ultra high molecular weight polyethylene.

Another example implementation involves a suspension system for passive stabilization of a payload on an aerial platform tethered by means of an anchor line, the system comprising:
(i) a gimbal system mounted on the aerial platform, the payload being suspended in the gimbal system, and
(ii) tensioned cords connected to the anchor line, the cords applying external forces to the gimbaled payload, such that change in orientation of the aerial platform has a reduced effect on the payload while the payload is constrained by the cords.

In such a suspension system, the gimbal system may be a double gimbal system. In such a case, one of the gimbals of the double gimbal system provides freedom of rotation in the roll motion direction and the second of the gimbals provides freedom of rotation in the pitch motion direction. Furthermore, the double gimbal system may comprise two generally orthogonal gimbals to allow freedom of roll and pitch motion of the payload relative to the platform.

In any of these exemplary suspension systems, the cords may be connected to the anchor line by means of weights sliding on the anchor line, such that the cords are tensioned by the gravitational forces of the weights. Alternatively, the cords may be connected at fixed points to the anchor line via extended elastic sections, such that the cords are tensioned by the extended elastic sections. Any of the extended elastic sections may be a stretched spring or a stretched elastic section of cord.

Additionally, an alternative implementation of the above-described suspension systems may involve a suspension system for passive stabilization of a payload on an aerial platform tethered by means of an anchor line, the system comprising:
(i) a double gimbal system for mounted the payload on the platform, the double gimbal system comprising:
 (a) a first gimbal frame to provide freedom of rotation around a first axis of rotation, and
 (b) a second gimbal mounted within the first gimbal frame, to provide freedom of rotation of the payload around a second axis of rotation, generally perpendicular to the first axis of rotation, (ii) a first pair of cords attached to the first gimbal frame at positions to rotate the first gimbal frame around the first axis of rotation,
(iii) a second pair of cords attached to the payload at positions to rotate the payload around the second axis of rotation, and
(iv) a tensioning device which maintains each cord of the pairs of cord under tension, such that the payload essentially maintains its initial angular pose independently of the angular orientation of the kite.

In such a suspension system, at least one of the first and second pairs of cords may be attached to the anchor line by means of a weight attached to each pair of cords remotely from the kite, the weights being adapted to slide along the anchor line, providing gravitational tension to the at least one pair of cords.

Alternatively, at least one of the first and second pairs of cords may be attached rigidly to a point on the anchor line, by means of a strained extendible section, providing elastic tension to the at least one pair of cords. In such an implementation, any one of the strained extendible sections may be either a stretched spring or a stretched elastic section of cord.

Still other example implementations involve an aerial platform comprising:
(i) a kite structure providing a level of directional stability when elevated in a wind environment,
(ii) a lighter-than-air inflated balloon structure attached to the kite by means of a cord, such that the balloon is located above the kite, and
(iii) a payload attached to the kite,
wherein the physical separation of the balloon from the kite increases the isolation of the payload attached to the kite from undesired motion generated in the balloon by the wind. In such an aerial platform, the kite structure may further be such as to provide a level of lift when elevated in a wind environment.

In either of the above described implementations of these aerial platforms, the cord may have elastic properties adapted such that additional shock isolation is provided to the payload, either by means of at least one spring section along its length, or by means of at least one elastic section along its length.

Furthermore, the payload may be attached to the kite structure by means of a directional stabilizing harness. This stabilizing harness may be a Picavet-type suspension.

Alternatively or additionally, the payload may be directionally stabilized by use of an active control system.

BRIEF DESCRIPTION OF THE DRAWINGS

The present invention will be understood and appreciated more fully from the following detailed description, taken in conjunction with the drawings in which:

FIGS. 4A and 4B illustrate schematically a composite connection line of the present system.

DETAILED DESCRIPTION

Figure 1:
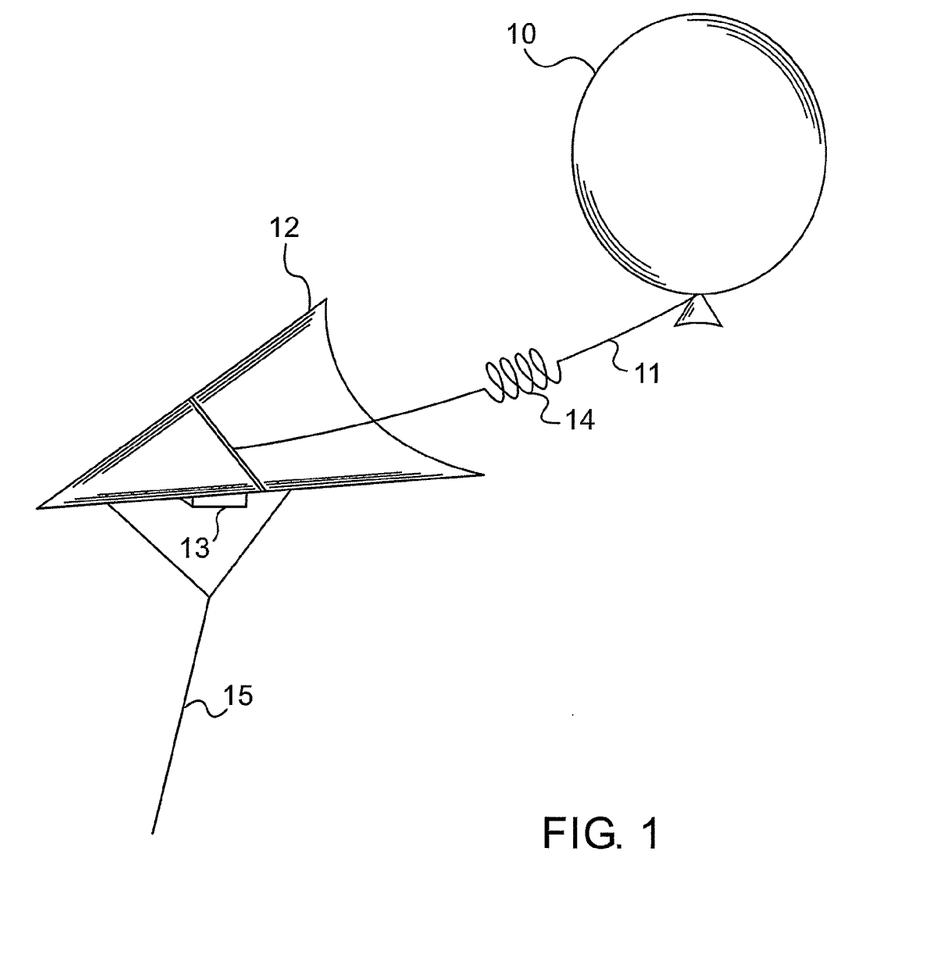
FIG. 1 shows schematically an exemplary system for implementing an aerial platform of the type described in the present disclosure, using a balloon and a kite.

Reference is now made to FIG. 1, which illustrates schematically an exemplary system for implementing an aerial platform of the type described in the present disclosure. The main buoyancy system is provided by the helium balloon 10, which operates to provide lift, known in the art as static lift, even under zero wind conditions. Although the balloon is shown schematically as a round balloon, it is to be understood that it can take any other shape, and especially an asymmetric shape designed to provide a greater level of directional stability in the wind. Line 11, connects the underside of the balloon to a kite 12. The line should be of sufficient length such that the kite 12 and balloon 10 are able to move freely relative to each other, constrained only by the length limitations of the line 11. The entire system is connected to the ground by means of a cord connected to the kite. The kite provides a level of directional stability in the wind, which if gusty, would cause the balloon to shake, even violently in high winds. It also provides a lifting force, known in the art as dynamic lift, which increases with the strength of the wind such that it resists the balloon's tendency to be dragged laterally by the wind. This combination of properties ensures that the angle made by the tethering cord with the vertical is smaller than would be obtained using only a balloon, such that when there is a significant wind, the aerial platform can rise to a higher altitude for a given length of tethering cord than would be possible using only a balloon. The stronger the wind, the more dominant is the effect of the kite.

The payload 13 may be attached to the kite, or to a suspension system attached to the kite. The line 11 connecting the balloon to the kite serves the additional effect of providing a level of shock isolation and motion isolation between the balloon, which is subject to buffeting by the wind, and the kite, which has greater stability in the wind. The payload 13 thus has an added level of isolation from rapid movements in gusty winds. The line 11 can also include a purposely added section, 14 having a higher flexibility, such as an elastomer section, or a coiled spring, thereby even increasing the shock isolation of the payload on the kite. Furthermore, the length of the connecting line 11 also has an effect on the level of mechanical isolation achieved; the longer the line, the greater the level of isolation. This effect arises since the longer the line connecting the kite to the balloon, the smaller the changes in the angle of application of forces on the kite from changes in position of the balloon arising from wind changes.

In order to provide further directional stability to the payload, especially for use as a surveillance or aerial photography or target designation platform, which require a high level of directional pointing stability, the payload may be attached to the kite by means of a direction stabilizing harness, such as a Picavet suspension, as is known in the art.

Figure 2A:
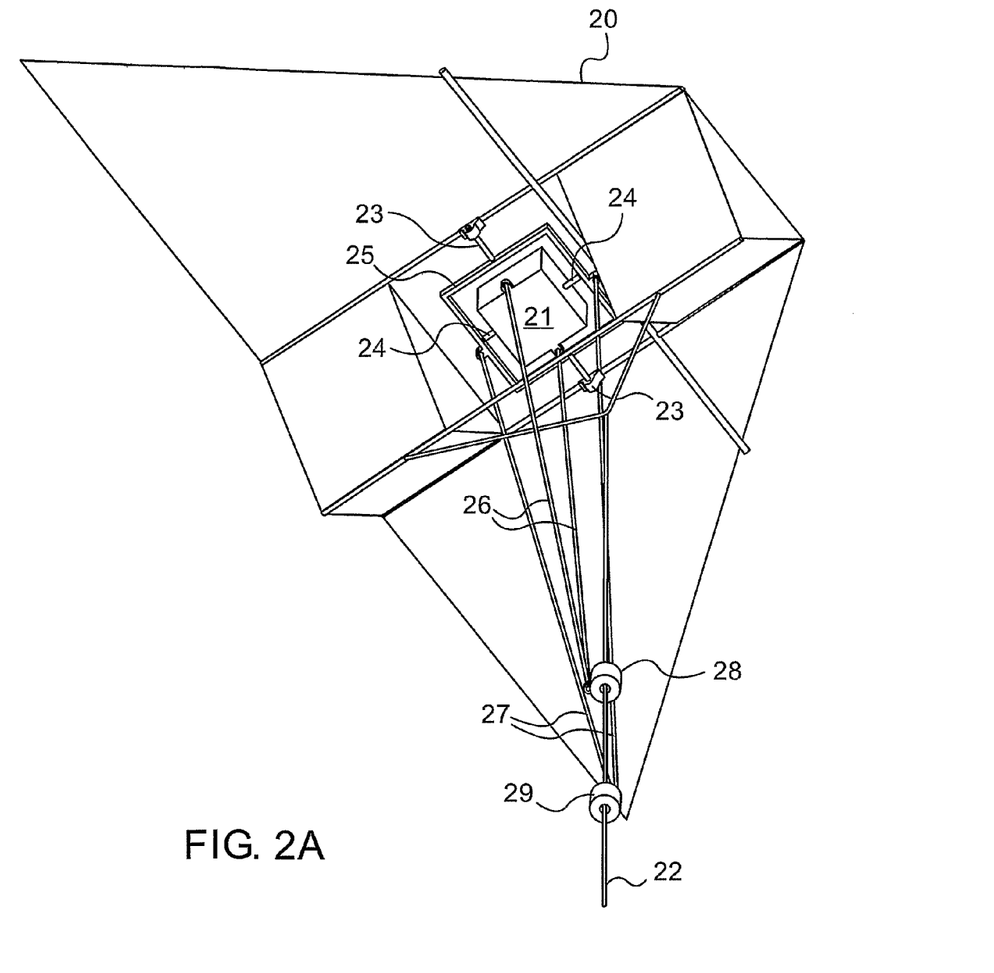
FIGS. 2A to 2C illustrate schematically different views of novel passive stabilization suspension devices for use in any type of lighter-than-air or kite type of platform.
Figure 2B:
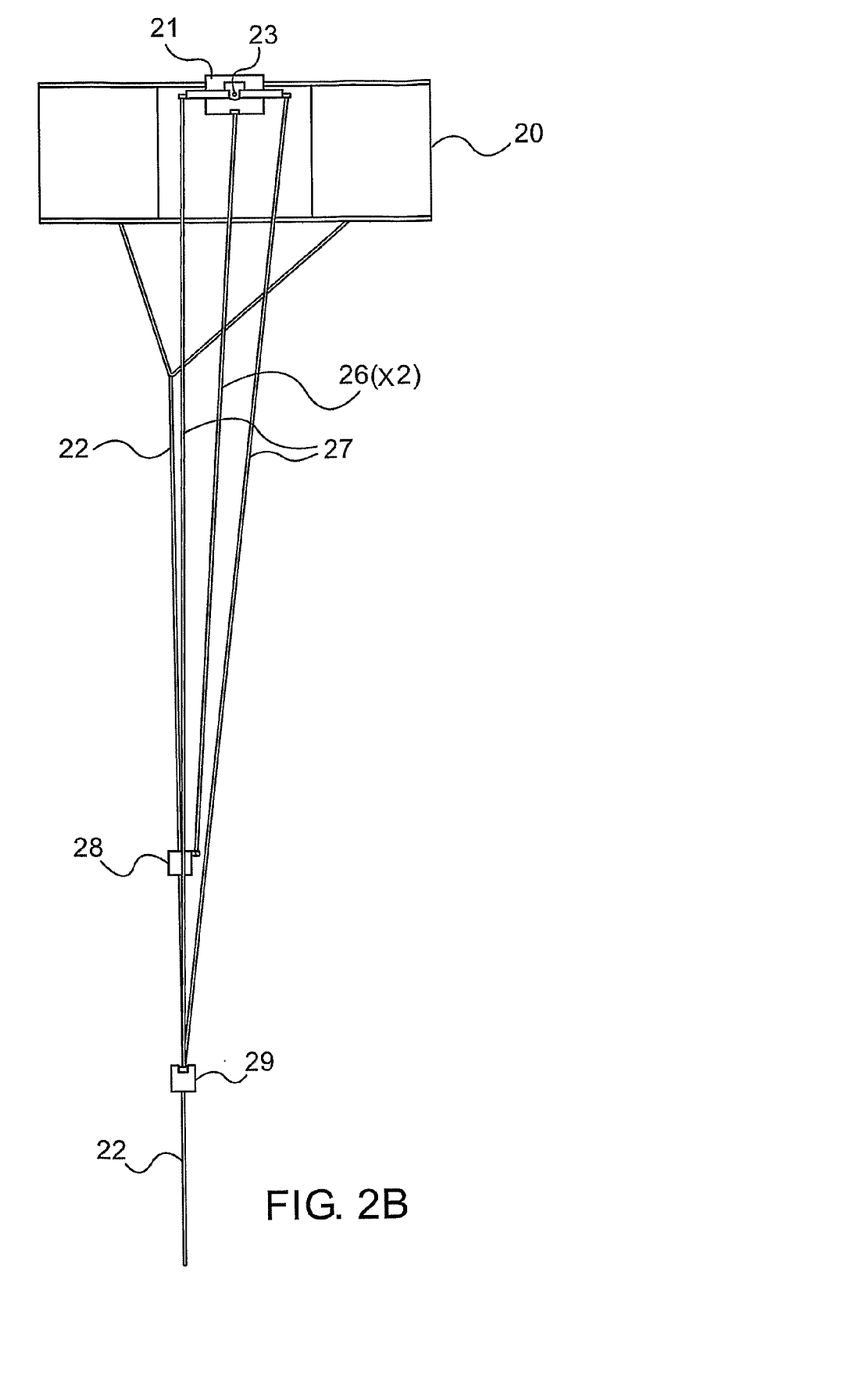
Figure 2C:
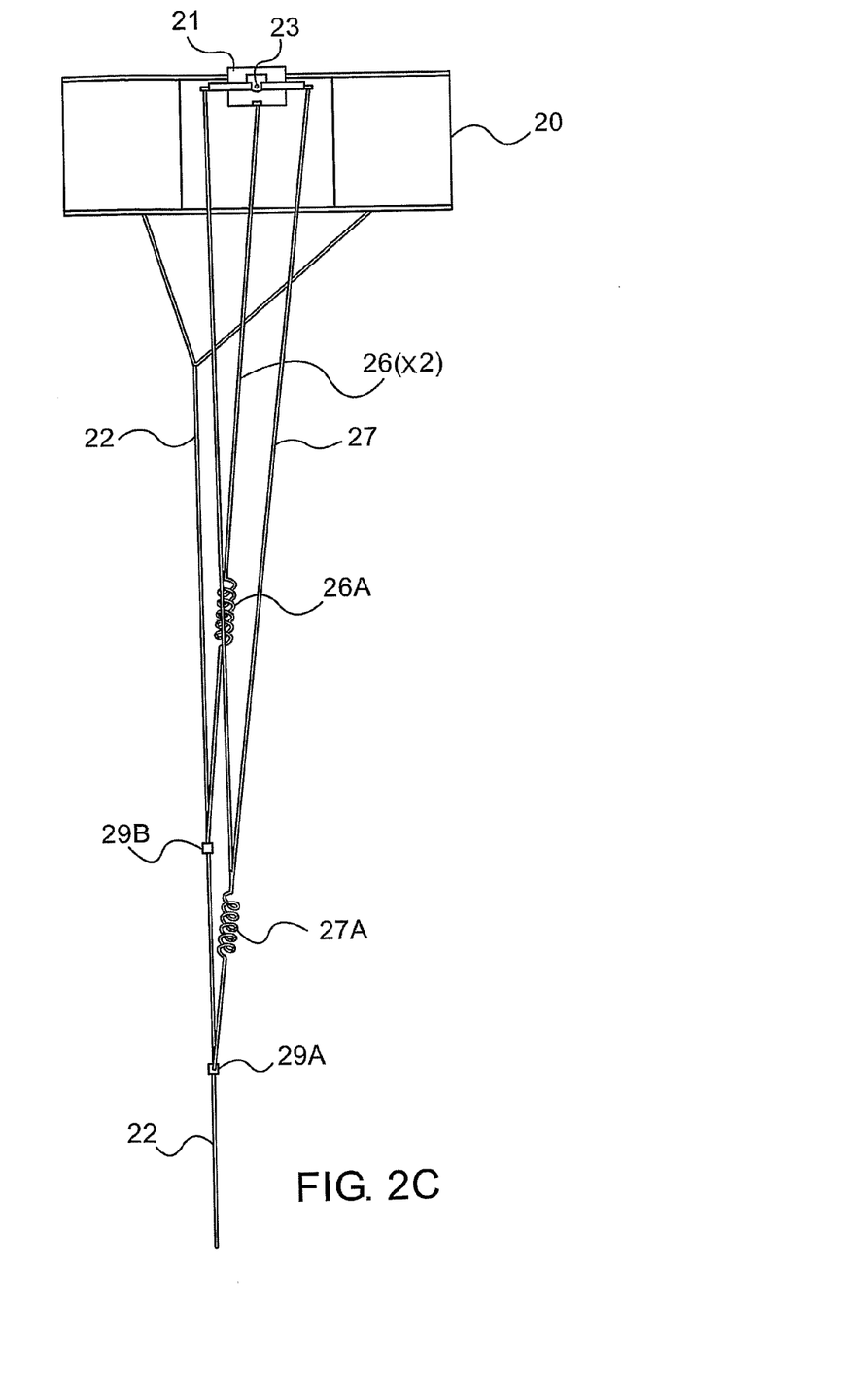

Reference is now made to FIGS. 2A to 2C, which illustrate schematically different views of a novel passive stabilization suspension device implementation, suitable for the payload of the platform of the present described systems, or for use with any other type of lighter-than-air or kite type of platform.

FIG. 2A, which is an isometric perspective and FIG. 2B which is a side view, show a kite 20, anchored to the ground by means of an anchoring line 22 attached to the underside of the kite 20. The upper end of the anchor line 22 may be regarded as the angularly most stable item associated with the kite. It does not vibrate significantly, since such an effectively long "spring" has a very low resonance frequency. Furthermore, changes in the angular orientation of the kite will not generate changes in the angular orientation of the anchor line. Such changes can arise only from spatial position changes of the kite itself, but these are relatively slow changes, typically less than 1 m/sec. Since the line length may be of order of hundreds of meters or even more, such a linear change in the kite position will cause only very small changes in the anchor line angular orientation, which can therefore be regarded as a fixed reference line in comparison with the expected motions of the kite itself. For instance, for a 500 m long line, kite lateral motion of 1 m/s will result in a change of only ~0.1°/sec in the anchor line angle.

Referring back to FIG. 2A, the payload 21, is mounted on the kite 20 by means on two serially mounted gimbal systems, with their pivot axes generally orthogonal. Such a double gimbal system provides stabilization in the two directions primarily requiring stabilization in a kite system. Gimbal axis 24 attached to the payload, allows the payload to roll freely relative to the kite, while gimbal axis 23, attaching the frame 25 of gimbal axis 24 to the kite, allows the payload to pitch freely. Thus the gimbal system 23, 24 allows freedom of roll and pitch motion of the payload relative to the kite, such that if the payload can be stabilized relative to a fixed feature, the gimbal system will enable it to maintain that position independently of the motion or orientation of the kite. Such a fixed feature, as has been shown above, can be effectively provided by the anchor line of the kite.

Although the example shown in FIGS. 2A-2B show the gimbals arranged such that the payload gimbal pivot axes 24 provide freedom of roll, and the outer gimbal pivot axes 23 provide freedom of pitch, it is to be understood that this configuration is not intended to limit the systems described in this disclosure in any manner, but that these passive stabilization suspension systems can be equally well operative with the gimbal roles reversed, or even with axes arranged at orientations not exclusively involving roll or pitch motions. A requirement of the systems is that the payload be freely suspended in the double gimbal system, such that the motion of the kite is not directly transferred to it while it is constrained by an external force maintaining a preferred orientation.

In the suspension system described in FIGS. 2A, 2B, the payload 21 is stabilized relative to the anchor line by means of weights sliding on the anchor line 22, and attached to the payload by means of long cords. Thus, cords 26 are attached between both sides of the payload 21 and the weight 28, and when tensioned by the weight itself, they maintain the payload at a fixed angular roll position relative to the roll gimbal axis 24. At the same time, cords 27 are attached between both sides of the frame holding gimbal axes 24 and the weight 29, and when tensioned by the weight itself, they maintain the frame at a fixed pitch angular position relative to the pitch gimbal axis 23. The tensions on the two sets of cords ensure that the payload 21 maintains its initial position, determined by the relative lengths of the two pairs 26, 27 of cords, independently of the angular orientation of the kite 20. The tensioning cords should be made as long as practically possible, in order to compensate for the spatial differences between the centre of rotation of the payload and that of the kite support point. Thus, the referencing of the payload stabilization direction to a distant point on the kite anchoring line, results in a greatly reduced effect on the payload, of changes in the kite orientation.

A central feature of the arrangement shown in FIGS. 2A, 2B, is the tension applied by the load cords to the various attachment points of the gimbaled payload 21. The use of gravitational tension applied by weights is not the only method of applying these tensions, and in fact may be disadvantageous because of the need to add dead weight to the aerial platform, at the expense of the payload itself. Reference is now made to FIG. 2C, which illustrates an alternative method of providing these tensions. In the implementation of FIG. 2C, in place of the sliding weights 28 29, the attachment cords 26, 27 are fixed to the anchor line 22 at predetermined fixed positions 29A, 29B. Each pair of attachment cords 26, 27 is individually joined together to form a single cord at a point distant from the kite, and each of these single common cords of each pair is provided with an extendable elastic section 26A, 27A along its length, such that each pair is connected to the anchor line via its elastic section. The elastic sections can be either in the form of coiled springs, or as flexible sections capable of stretching under tension. The cords are pre-tensioned before being fixed to the anchor line, such that they maintain the downward tension on the payload and its gimbals, thereby maintaining the payload's orientation without the need for additional on-board weights.

For more exacting requirements, such as when the payload includes directionally sensitive equipment such as high magnification camera module or a laser range finder, the payload must be more completely stabilized (to as little as 100μ in a frequency range of 0-100 Hz), and this can be achieved only by means of active stabilization. One effective solution is to use 3-axis gyro accelerometer stabilization. This stabilizer comprises three motorized axes that can rotate the payload about 3 axes (x, y and z). Three accelerometers (gyros) are attached to the payload, each accelerometer measuring the payload angular acceleration in different axes, and each outputs an electrical signal equivalent to that acceleration. This signal is transferred to a control system that drives a servo motor operative to rotate the payload about that axis, and to reduce this angular acceleration. This system can operate in either an open loop method, or in closed loop, by which the control system uses a feedback algorithm that provides the drive signals to the motors so that they counteract the angular acceleration, angularly stabilizing the payload.

When the payload consists an electro-optical module, such as TV camera, there is often need to change its line-of-sight so it will be able to view any direction. In this case, the stabilization motors can be used also for this purpose. Furthermore, if the payload includes an observation system, there is often need for it to be locked on a target, and even when the vehicle changes its position or direction, the system should still view the same target.

In this case, the motors can also be controlled also by a control circuit that measures the vehicle position, using GPS, inertial gyros, or any other method, and determines its point of view by measuring the direction of the line of sight of the system, and finding its intersection with the land. The land data may be obtained from a digital map database, the measurement of the boresight from sensors aligned with the camera, and a GPS receiver can be used to measures geographical north. In this way, the control system can input directional corrections to the motors, to maintain the image of the camera on the required target.

The aerial platform is anchored to the ground station by means of a cord 15, which has to be strong enough to withstand a combination of the upward forces applied by the uplift of the balloon/kite assembly and the lateral forces generated by the wind. At the same time, the cord has to light enough not to encumber the uplift power of the balloon/kite assembly, and since the length of the cord may need to be in excess of a kilometer, the weight of the cord could be significant. Therefore, this combination of high strength and low weight per unit length is a severe requirement to achieve.

There are three possible sources for the energy required to operate the payload:
(i) On-board batteries
(ii) Solar energy
(iii) Ground-sourced energy delivered through the connection line.

Each of these options has its advantages and disadvantages, dependent on the size, function and power consumption of the payload. Taking an optical surveillance system as a typical payload carried by such a system, the following calculations can be made to estimate the electrical requirements of the payload. It is to be understood though that this is merely an exemplary situation, and the invention is not meant to be limited by this example.
(i) Battery Power.

The average power consumption of the payload and the platform for an optical surveillance system may be of the order of 15 W. If the system is a thermal imaging system, power consumption can reach 30 W. One of the most efficient, commonly used battery types today is the lithium-polymer battery. Its energy capacity is of the order of 150 Wh/Kg. Thus, a power consumption of 15 W means that for every hour of operation, 100 g of battery are required. Therefore, for typical total payload of 1 kg, and 5 hours of operation, which is typically a minimum time required to make deployment of the system worthwhile, the required battery weight is 500 g. In other words, the batteries would take 50% of the payload weight, which may significantly limit the payload performance. For thermal imaging applications, the batteries would weigh 200 g per hour of operation, such that this would not be practical for most applications, especially where the size and weight of the aerial platform is limited. It is thus clear that the use of on-board battery power is marginally practical or even impractical.
(ii) Solar Energy.

Using triple junction solar cells, having an average efficiency of 20%, the required cell area to supply 15 W is 0.09 sq·m. This area is conveniently small, and can be of sufficiently low weight—approximately 100-200 g. However, the power which the cells can supply is dependent on the illumination level. During the night, and on cloudy days, this solution is impractical without the use of storage batteries, and their incumbent disadvantages. Therefore, it appears that the use of solar energy is also not a practical solution.
(iii) Ground-Sourced Energy Delivered Through the Connection Line.

Another method is to deliver the energy from the ground station through the connection line to the platform. One advantage of such ground-based power delivery is that there is no limitation to the flight endurance of the platform because of the availability of power. Assuming the supplied voltage through the connection line to be of the order of 100V, the required current to supply the 15 W required is of the order of 150 mA. In order to avoid an excessive voltage drop along the wire, it should be a few hundreds of microns in diameter. Using this diameter, for a copper pair of wires, a length of 1 km of wire could weight a few kilograms, which could not be easily raised by the balloon/kite assembly.

The aerial observation systems of the present disclosure therefore differ from prior art systems in that the power is supplied to the payload as optical power along an optical fiber. In a single-mode or multi-mode fiber, it is possible to transfer tens or even hundred of watts of optical power, along distances of kilometers, with very little loss of power through attenuation.

Figure 3:
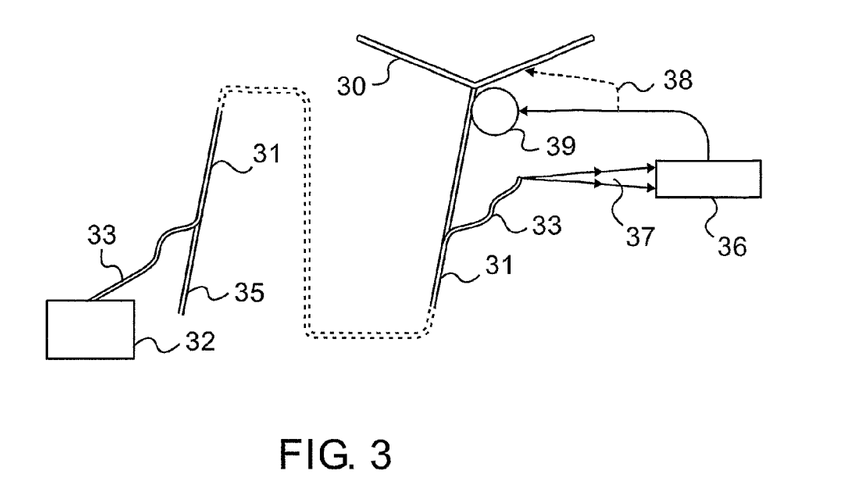
FIG. 3 illustrates schematically an energy supply system for the aerial surveillance platform of FIG. 1, implemented using optical fiber power delivery.

Reference is therefore now made to FIG. 3, which illustrates schematically an energy supply system for the aerial surveillance platform 30, implemented using optical fiber power delivery. Since the optical fiber itself does not have the mechanical strength to hold the balloon/kite assembly 30, the connection line 31 is provided with a composite structure combining the fiber with a mechanically stronger line. A novel way of achieving this is described hereinbelow.

The optical source 32 injects light into the fiber output 33, which is mechanically attached to the mechanical line 35, to make the composite connection line 31. The fiber coupled light source can be a single laser diode or a laser diode bar, or any combination thereof, a fiber laser, such as an erbium doped fiber laser, a fiber amplifier such as an erbium doped fiber amplifier, or any other suitable light source. Fiber coupled laser diodes are available in a variety of wavelengths, output power and fiber core diameters. They are available commercially, have high reliability, high output power and good electrical efficiency.

A first example of such a device is the ProLite® Xt Orion™ model MEA200-810-18-001 diode laser, available from the Spectra-Physics Division of Newport Corporation, of Irvine Calif. 92606, and having main specifications:
Wavelength: 805 nm
Output power: 18 W
Fiber core diameter: 200 μm
Power conversion efficiency: 40%

Another example of such a source is a fiber-coupled laser diode model F50-808-2 available from the Apollo Instruments Inc. of Irvine, Calif. 92606, and having main specifications:
Wavelength: 808 nm
Output power: 50 W
Fiber core diameter: 200 μm Fiber lasers are also an option for this application, but are more expensive, less efficient and can be more sensitive to optical damage, due for instance, to the coherence characteristics of the laser source.

A diode pumped solid state (DPSS) laser light source, or another such free space cavity laser, may also be used, and such lasers have the advantage that their power density can be much higher than that of a laser diode, and hence it is possible to use a lower fiber core diameter, and to reduce the fiber weight, yet still to transmit the desired power. Thus, a DPSS laser, such as a Nd:YAG laser can be advantageously used as the light source.

The optical fiber 33 can be a single-mode or multi-mode optical fiber, or any other type, such as a PMF fiber, or a dual core fiber or a doped fiber. The optical fiber is integrated into the connection line 31, and transfers the light up to the platform 30. The dashed folded section of the line 31 is a schematic representation of the long length of connection line between the ground station and the aerial platform 30. When the connection line is close to the platform, the optical fiber 33 is split from the connection line 31, and is directed to an optical detection module, where the fiber terminates, releasing the transported light into free space propagation 37. This emitted light is focused using optics, or is directed unfocused onto a photo-detector 36. The photo-detector is operated in a nearly photo-voltaic mode, similar to solar cells, and converts the incoming light into electrical power. This electrical power is supplied to the payload 39, and if needed, also for functional or control activities 38 of the aerial system 30 itself.

For 60×60 mm illumination area on the photovoltaic converter, and with an incident light power of 35 W, the light flux on the photodiode is approximately 1 W/cm$^2$, which is 10 times higher than the solar radiation on earth. Most photovoltaic detectors are not suitable for this level of flux, and the best solution may be to use a solar cell, which has a very low cost and is designed and produced to convert such energy at a high efficiency and high flux.

The transmitting fiber is an optical fiber that is suited for the laser diode characteristics. It should have high transmission in the relevant spectrum and be able to sustain high density power. In order to reduce its weight, its cladding diameter should be as small as possible, as also its buffer diameter. To avoid any misunderstanding of the fiber structure terminology used in this application, the cladded core of the fiber is understood to be surrounded by a thin "buffer", this constituting what is called the "bare fiber", and this "bare fiber" is protected by a "jacket" to add mechanical strength to the fiber. The bare fiber should not include any additional envelope material, its outer envelope being the buffer. A standard fiber has a 250 μm buffer diameter. Assuming that all of the fiber material is silica, (which is only an approximation since the buffer material is generally a polymer with lower density than silica), since the silica has a density of 2.2 g/cc., 1000 m of this fiber will weight approximately 110 gram.

However, the bare fiber (including only its buffer and without any jacket shielding envelope) is very sensitive to damage—mainly to bending and scratching. In order to avoid fiber damage, the tension on the fiber should be kept low, with the vehicle's lift and drag forces assigned to the mechanical part of the connection line, and not to the fiber. Furthermore, the fiber releasing and rolling mechanism should avoid undesired damage to the fiber.

Figure 4A:
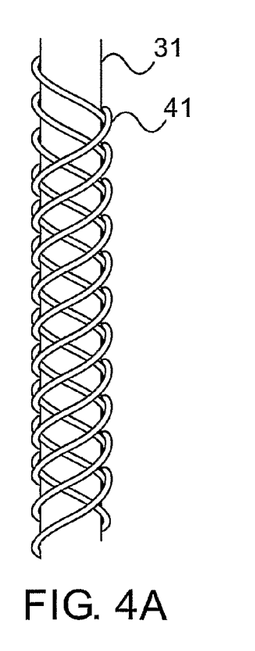
FIG. 4A is an external view of an example of such a line.
Figure 4B:
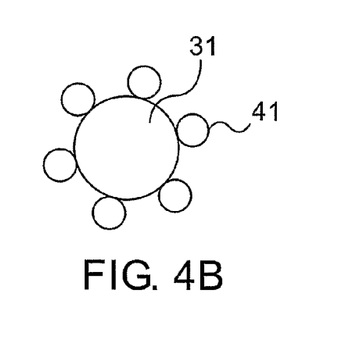
FIG. 4B is a cross section of the line shown in FIG. 4A.

Reference is now made to FIG. 4A, which illustrates schematically a representation of the novel composite connection line of the present system. This novel form of construction for a connection line is what enables the line to achieve the above stated objectives. The bare fiber 31 is enclosed in a plaited jacket of fine, high tensile strength fibers or threads 41, preferably made of one of the modern composite or polymer materials, such as Spectra™, an ultra high molecular weight polyethylene (UHMWPE), with aligned molecules, or Vectran, or combinations thereof, to generate a structure which is low weight, strong, flexible and protective to the fiber. Such materials have strength-to-weight ratios in a range from 10 to 100 times higher than that of steel. The jacket can be woven onto the fiber using a conventional plaiting or braiding machine, as is known in the art, taking the plurality of jacket fibers, and plaiting them onto the outside of the fiber as it is fed slowly through the plaiting machine. FIG. 4B illustrates a cross section of the composite connection line of FIG. 4A, showing the optical fiber 31 surrounded by its plaited outer layer 41, providing it with strength and protection. A typical plaiting fiber for braiding a 250 μm fiber could be made of Spectra™ fiber, having a tensile strength of 10 Kg. The resulting composite connection wire using a plaited jacket of 8 such threads has a breaking force of 80 Kg. Since the plaiting thread is made of a non-conducting material, the entire connecting line is therefore an electrical insulator, and this assists in safety to the ground station personnel from lightning during periods of electrical storm activity.

The power density transferred through the fiber is very high, and requires special precautions to meet the laser safety rules for use of a laser light source which is meant to be eye-safe under all conditions, namely a class 1 laser light source. In order to meet these requirements, the laser output leakage flux should be lower than 5-8 mW/cm$^2$ for wavelengths in the range of 800-1100 nm. For light power of a few tens of watts being transmitted inside the 100 μm core diameter of the fiber of the connecting line used in the systems described in this disclosure, this is relatively difficult requirement to achieve. Furthermore, any small amount of light leaking from the fiber due to even very superficial damage, will, if absorbed locally, cause increased damage from the local heating generated. According to one method of avoiding a high level of light leakage from the fiber, the outer braided jacket of the optical fiber should be of a low absorbance whitened material, such as white Spectra™. A whitened outer surface reflects back into the fiber the major part of the light incident on it, thus avoiding any significant surface heating effect by surface absorption in the event of a leakage. Furthermore, the white reflective material will prevent escape by transmission, of much of the light emitted, since the white braiding will generate multiple reflections of the leaked light thereby spreading its escape profile over a larger area. Alternatively, a transparent material can be used for the braided jacket, which, though not providing eye-safety on its own, will very efficiently prevent local heating because of the low absorption of the jacket.

Figure 5:
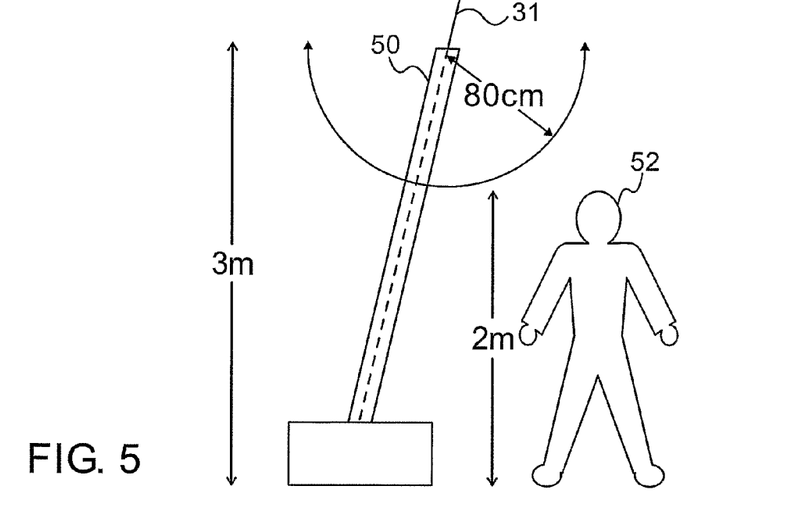
FIG. 5 is a schematic drawing of a shielding sleeve arrangement used to prevent leakage from the connection line from being unsafe to the eyes.

For the purposes of an exemplary calculation, a fiber can be considered emitting 1 W over a Numerical Aperture of 0.1. At a distance of 80 cm from the line, the light flux will be 5 mW/cm$^2$, and will therefore be classified as eye-safe. Therefore, if the connection line 21 with the fiber in it, is wrapped in a shielding sleeve 50 up to a height of 3 m from ground, as shown in FIG. 5, more than 80 cm from the region in which a tall person 52 has access, the leakage from the fiber will be considered eye-safe. The shielding sleeve 50 can be a flexible sleeve, or a periscope rod type of cover, or any other opaque sleeve.

Figure 6:
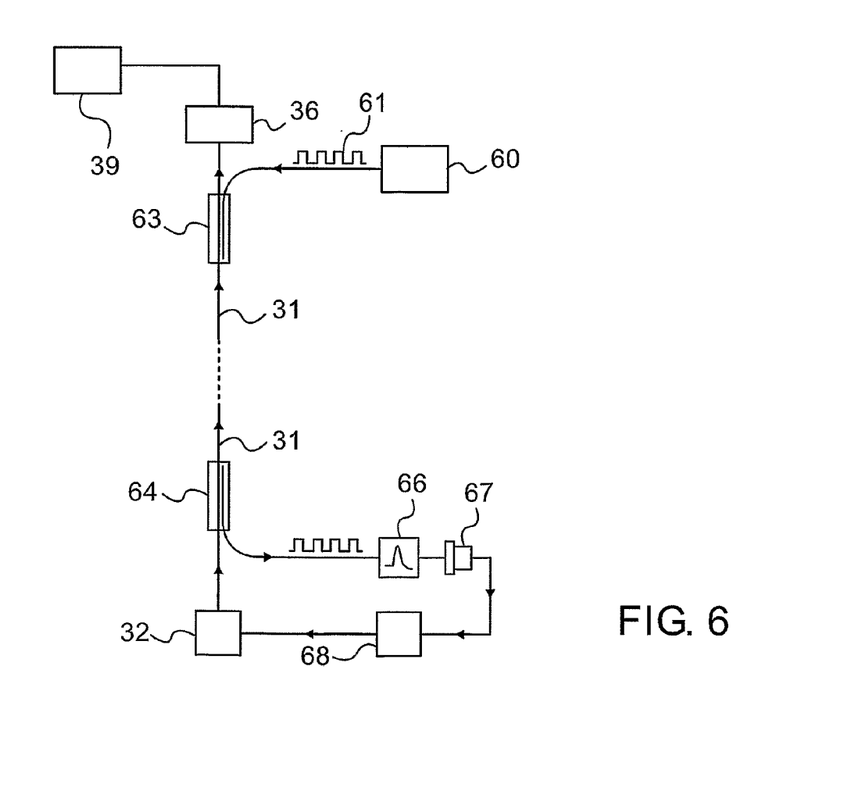
FIG. 6 shows a schematic drawing of a system of control for implementing shut down of the light source in the event of a rupture in the connection line.

However, a more serious situation is how to maintain eye safety if the connection line is ruptured or suffers other damage. In this case, light transmitted through the fiber will be freely emitted. This situation can be rendered safe by using a monitor optical signal transmitted through the entire length of the connection line to ascertain its integrity, and an automatic shutdown of the light source if a break is detected. One system of control for implementing this is shown in FIG. 6. The light source 32 transmits its high optical power through the fiber of the connection line 31 to the photovoltaic or solar cell 36 situated on the kite, from which electric power is provided to the payload 39. A comparatively weak modulated optical signal 61 is generated by a source 60 disposed on the aerial system. This signal is advantageously generated at a wavelength different from that of the optical power transmission from the ground to the aerial vehicle. The modulation may be at any frequency that can readily distinguish the signal from random noise pickup. This monitor signal is coupled into the fiber of the connection line 31 by means of an optical coupler 63, and is transmitted down to the ground station, where it is coupled out of the line by another optical coupler 64. A tuned bandpass or notch filter 66 is used to pass only the modulation frequency of the monitor signal, which is then detected in a photodetector 67. The output from the photodetector is input to a control circuit 68, which provides an enable signal to the light source 32 so long as the monitor signal is present. Alternatively, the control circuit 68 can be configured to provide a disenabling signal to the source 32 if the monitor signal ceases. Thus, if the connecting line is ruptured, the light source will be turned off, preventing dissipation of the high power light in the fiber. This procedure can be applied by hardware or software. The response time to activate this procedure can be made very short, down to a few microseconds or less, as limited by the response time of the photodetectors, thus keep the system laser safe even in such a critical emergency situation.

Although the safety system has been described transmitting the modulated monitor signal from the airborne platform to the ground, where the optical source is situated, it is to be understood that the monitor signal can just as well be transmitted in the opposite direction, from the ground to the airborne platform, with the generated enabling or disenabling signal being transmitted from the payload down the fiber to cease operation of the light source. In the case of an upward directed monitor signal, the use of a coupler 63 may not be essential, since the monitor signal can be extracted from the edge of the free space propagated optical power 37 directed to the photodetector from the end of the fiber, as shown in FIG. 3. Furthermore, although a modulated monitor signal is described in this implementation, such modulation providing good discrimination from interference, it is to be understood that any other method of detecting the presence or absence of the monitor signal may equally well be used, such as reliance on optical filtering to detect the wavelength of the monitor signal, or on time-domain reflectometry.

Figure 7:
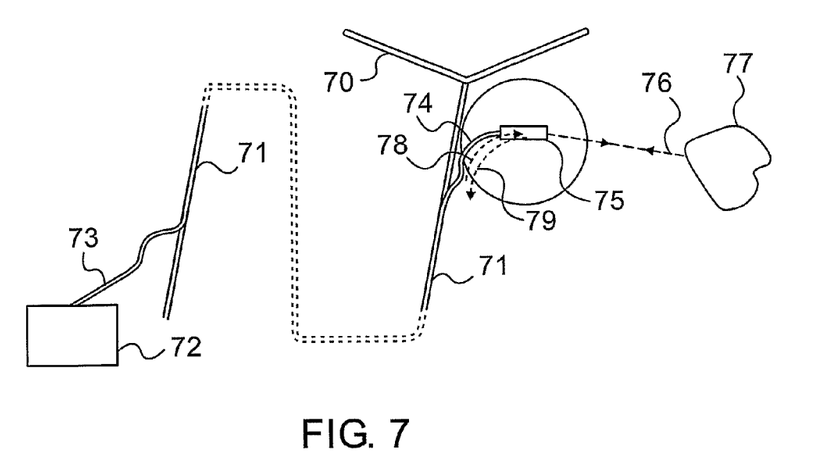
FIG. 7 shows schematically an exemplary laser range finding, or laser designating system using an optical fiber power delivery system described in FIG. 3.

Reference is now made to FIG. 7 which illustrates schematically an exemplary laser range finding, or laser designating system using the type of optical fiber power delivery system described hereinabove in relation to FIG. 3. In FIG. 7, there is shown a composite connection line 71 running from the ground station to the aerial platform 70. The dashed folded section of the line is a schematic representation of the long length of connection line between the ground station and the aerial platform 70. The laser source, including both the laser head and its accompanying power supply, is located in its module 72 in the ground station, and transmits the range finding or designating laser signal up the fiber to the aerial vehicle, where it is led 78 along coupled fiber 74 into the collimating and steering optics 75 for transmission out to the region of interest. As with the example of FIG. 3, part of the power may be used for other payload purposes. In the case of a laser range finding application, the signal is transmitted to the target 77, and reflected therefrom along the same path 76, though generally widely diverging, and is then received by the optical head 75 and is transmitted back 79 down the fiber to the range finding apparatus in the ground station module 72. By this means the only optical components which need be mounted on the aerial vehicle are those associated with the beam collimating and steering functions, these being substantially lighter in weight than a complete laser range finding head.

There are a number of practical details relating to the optical properties of the transmission fiber, specific to the laser range finding application, which need to be taken into account:
(i) In order to increase the range finding accuracy, the optic fiber should be a single mode fiber or multi-mode graded index fiber. Use of such fibers reduces the modal dispersion of the signal during transmission.
(ii) The optical fiber for transmitting the range finding signal can be either the same fiber as that for transmitting the optical power (and/or the data communication), or it can be a separate fiber.
(iii) If the fiber is combined with the energy supply fiber, it is possible to use a double-core fiber—the inner core being a single mode waveguide for the range finding light, and the outer core, a multi-mode core for the supplied optical power.
(iv) If the range finding light is combined with any other light transmission, such as the optical power transmission, a beamsplitter/combiner arrangement is required (not shown in FIG. 7), both in the vehicle payload and in the ground station, in order to separate these two components.
(v) In order to increase the measurement accuracy, a reference range finding measurement should be performed using the light reflected from the fiber facet in the payload. This measurement enables the transmission fiber optical length to be obtained, so that it can be subtracted from the target distance measurement to obtain the true target distance. This measurement may be performed regularly in order to keep the system properly calibrated, and may advantageously be made with each substantial change in the height of the aerial platform, since even though the transmission fiber is of a fixed length, being unwound from a reel when deployed, there may be changes in its effective length as the deployed length changes.

In the same way as described above for the Laser Range Finder, it is possible to implement the methods of this application for use as a laser designator. The high energy pulsed (coded or not) laser light source is positioned in the ground station and transmits its light energy to the vehicle through the optical fiber. The emitted light from this fiber in the payload is collimated in the same line-of-sight of the camera, and can designate targets in order to allow laser guided weapon, such as bombs or missiles, to reach their target accurately.

Figure 8:
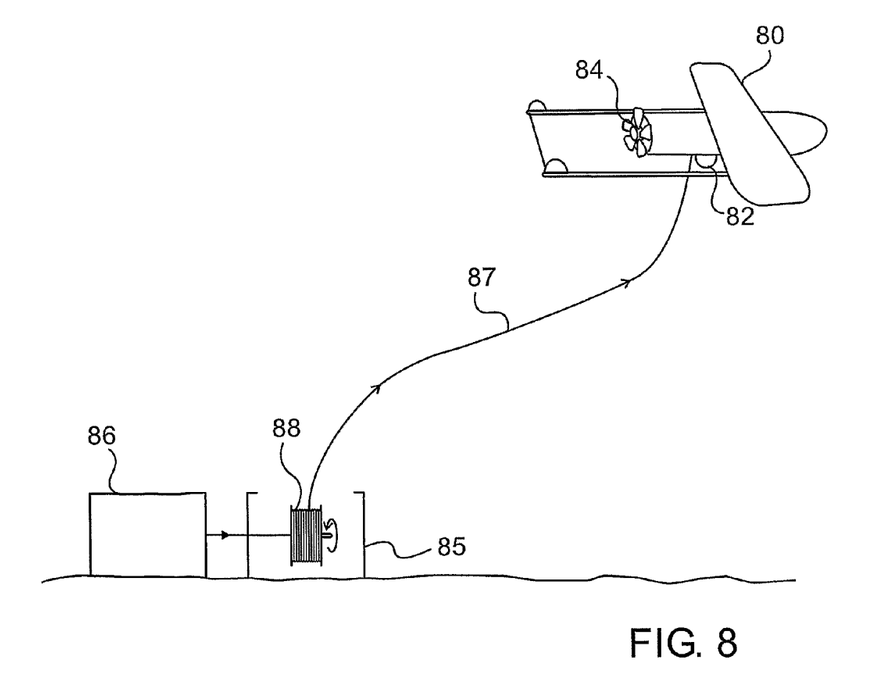
FIG. 8 illustrates schematically a pilotless aircraft using the optical power transmission lines described in FIGS. 3 to 7 to power its electrical payload.

Reference is now made to FIG. 8, which illustrates a further system making advantageous use of the optical power transmission lines and their applications described hereinabove. FIG. 8 shows a pilotless aircraft 80, with a camera pod 82 for surveilling the territory over which it is flying or circling. Although a fixed wing aircraft is shown in FIG. 8, a pilotless helicopter type of platform could equally well be considered. The propulsion means may generally be powered by an internal combustion engine, such that flight endurance is not usually problematic. In order to supply electric power to the electronic surveillance equipment on board, a ground station 85 provides optical power, preferably from a laser source 86, which may then be transmitted to the pilotless vehicle through an optical fiber transmission cable 87 of the type described hereinabove. On board the vehicle, the optical power is converted to electrical power as described hereinabove. A reel mechanism 88 is required to pay out and to reel in the optical cable 87, according to the distance and height of the vehicle from the ground station. Such a system can also implement the other applications described hereinabove, such as the use of a ground-based laser to provide the power for an airborne laser range finder, or designator or the like, as previously expounded.

It is appreciated by persons skilled in the art that the present invention is not limited by what has been particularly shown and described hereinabove. Rather the scope of the present invention includes both combinations and subcombinations of various features described hereinabove as well as variations and modifications thereto which would occur to a person of skill in the art upon reading the above description and which are not in the prior art.

We claim:
1. A system for making range measurements to a target, said system comprising:
a laser based at a ground station;

a fiber optical line connecting said ground-based laser to an airborne platform, said fiber optical line adapted to receive optical power from said laser;

an optical unit mounted on said airborne platform, receiving optical power from said fiber optical line and transmitting at least part of said optical power into free space;

an optical head mounted on said airborne platform for receiving laser light reflected from said target, and for transmitting said received laser light fiber optically to said ground station; and a laser range finding analyzer at said ground station adapted to determine the range of said target, wherein said ground-based laser range finding analyzer measures the distance from said ground station to said airborne platform, so that the range measurement of said target from said airborne platform can be more accurately determined.

2. A system according to claim 1, wherein said measured distance from said ground station to said airborne platform is subtracted from a measured range of said target from said ground-based laser range finding analyzer.

3. A system according to claim 1 wherein said airborne platform is either of a tethered platform or a free-flying platform.

4. A system according to claim 1, further comprising:

a source generating an optical monitor signal, said optical monitor signal being optically coupled to said fiber optical line in the region of one of its extremities;

an optical monitor signal detector receiving said optical monitor signal in the region of the second extremity of said fiber optical line; and a control system adapted to disenable said laser if detection of said optical monitor signal ceases, such that fiber breakage does not result in undesired laser emission.

* * * * *